United States Patent [19]

Thomas et al.

[11] Patent Number: 4,530,764

[45] Date of Patent: Jul. 23, 1985

[54] DENSIFICATION OF PHOSPHATIC WASTES AND PHOSPHORIC ACID SLIMES AND SOLVENT RECOVERY

[75] Inventors: Iran L. Thomas, Tustin; Chung J. Lai, Placentia, both of Calif.

[73] Assignee: Occidental Research Corporation, Irvine, Calif.

[21] Appl. No.: 514,396

[22] Filed: Jul. 18, 1983

[51] Int. Cl.³ .......................... B01D 13/00; C02F 1/44
[52] U.S. Cl. .................................. 210/637; 210/651; 210/806; 210/907
[58] Field of Search .............. 210/650, 651, 653, 806, 210/907, 637, 321.1, 323.2, 335

[56] References Cited

U.S. PATENT DOCUMENTS

| | | | |
|---|---|---|---|
| 3,401,798 | 9/1968 | Nyrop | 210/321.1 |
| 3,472,765 | 10/1969 | Budd et al. | 210/651 |
| 3,835,040 | 9/1974 | Mahlman et al. | 210/724 |
| 4,242,193 | 12/1980 | Moeglich | 204/252 |
| 4,301,013 | 11/1981 | Setti et al. | 210/137 |
| 4,313,830 | 2/1982 | Tulin et al. | 210/651 |

OTHER PUBLICATIONS

Minturn, "Advanced Techniques for Aqueous Processing & Pollution Abatement" Oak Ridge Nat. Lab., Final Report, Aug. 1974.

Bureau of Mines Information Circular, IC 8668, 1975, pp. 1-20.

Primary Examiner—Peter Hruskoci
Attorney, Agent, or Firm—James F. Tao; William G. Gosz

[57] ABSTRACT

Phosphatic wastes produced during the mining and beneficiation of phosphate ore are concentrated by treatment in a crossflow filter under conditions which prevent the formation of a filter cake on the filtering surface. Slimes having an initial concentration of suspended solids, usually less than about 5% suspended solids, can be treated in series of crossflow filters to concentrate the solids to 24% or higher. In one embodiment a series of three spiral-wound crossflow filters followed by a fourth stage tubular crossflow filter is used to concentrate a slime having about 3% suspended solids to a concentrate having 30% or more suspended solids. By maintaining the linear velocity over the surface of the filter medium at 5 ft/sec. or higher a relatively high permeation rate can be achieved while producing a permeate having an extremely low suspended solids concentration. Proper selection of filter medium and flow rates can produce permeates having a turbidity less than about 5 Jackson Turbidity Units.

30 Claims, 4 Drawing Figures

DENSIFICATION OF PHOSPHATIC WASTES AND PHOSPHORIC ACID SLIMES AND SOLVENT RECOVERY

BACKGROUND OF THE INVENTION

Phosphatic wastes which are produced during the mining and beneficiation of phosphate ore usually are disposed of by pumping into storage ponds. For example, phosphoric acid produced by the dihydrate, hemihydrate or anhydrate process produces a clay waste frequently referred to as phosphoric acid slime in the washing and beneficiation operation. It is well recognized that the natural settling rate of phosphatic clay waste and phosphoric acid slimes is extremely slow. The suspended solids in such wastes and slimes have a rapid initial settling rate and will frequently settle from an initial value of about 3% suspended solids to about 5 or 6% suspended solids by the end of the first day. At the end of the first week such wastes and slimes frequently settle to about 10% suspended solids. Frequently, after about three months the solid content of the waste and slimes increases to about 15%. Further densification, however, is extremely slow. The time required to settle to about 18% suspended solids usually requires about one year. Concentrations to 20% or higher suspended solids usually requires several years. Sedimentation beyond 20% suspended solids is influenced by the individual characteristics of the particular slime which is related to the characteristics of the ore, and the particular pond maintenance procedures employed.

The magnitude of the water problem in phosphate rock production can be readily appreciated when it is realized that between 20,000 and 30,000 gallons of water per minute are utilized in a typical phosphate mine. As discussed above, to accommodate such clay waste and slimes, large impoundments covering 400 to 600 acres, with dam heights ranging from 20 to 40 feet are frequently employed. When these impoundments or ponds become filled with such wastes or slimes, new ponds must be built if phosphate rock production is to continue. Both completely filled ponds and operating ponds present potential environmental hazards due to possible dam failure. Reclaiming of impoundment areas generally is not possible before decades have passed after their filling. Even then, reclaiming such ponds for agricultural and other uses remains a difficult and costly procedure.

Thus, in the normal course of mining and washing operations, as active waste and slime ponds become filled and hence inactive, there is created a number of abandoned areas in such disposal acreage which may be as much as 40 years old or older. Generally, even these long abandoned areas will not have settled or dried to a high solids content. It has been reported, in fact, that there is little change in the solids content of old abandoned ponds with time.

FIG. 1 is an example of a typical settling rate curve for phosphatic slimes which is plotted on a semi-log scale. Although the initial settling rate over the first 10 to 12 months is fast enough to allow for recovery of about 80 to about 85% of the water contained in the waste or slimes pumped into the settling pond, approximately 10 to 20% of the water is lost by the combination of evaporation and confinement in the settled slimes. It has been estimated that this is equivalent to about 5 to 7 tons of water for each ton of phosphate rock produced.

FIG. 1 also shows that the settling rate for such aqueous slime mixtures exhibits a relatively steep slope at first, followed by a gradual flattening as hindered settling of the colloidal particles becomes more predominant. This, in turn, causes the solids concentration of the settled material to increase very slowly with time. This is due to the fact that such suspended solid particles settle relatively fast in a dilute pulp, but as the particles in the slime mixture become crowded closer together, the settling rate slows to a point where for all practical purposes an ultimate or limiting pulp density is reached.

There also have been studies on processes developed for the dewatering phosphatic wastes and slimes by treating such materials with a flocculant such as polyethylene oxide (PEO) and dewatering the resultant flocs with mechanical devices such as rotary screens. Although these processes are effective for accelerating the dewatering of such phosphatic waste and slimes, they suffer from the disadvantage of requiring a relatively expensive flocculant, the major part of which cannot be recovered and is forever lost with the agglomerated slimes. Furthermore, the water that is recovered from such flocculant processes is subjected to contamination by the flocculant and as a result thereof may not be suitable for reuse elsewhere in the mining and beneficiation operation without the separation and removal of the flocculant. For example, flocculant contaminated water may not be suitable for the flotation process because the flocculant can effect the flotation agents adversely. Furthermore, it is known that although flocculants will cause agglomeration with some clays of some phosphate rock, that flocculants will not cause effective and/or economical agglomeration with the clays of all phosphate rock.

Even where flocculants are capable of causing slimes to agglomerate, the process still requires large trommel screens to separate the agglomerated slimes from the separated water. Even then the water may be still highly contaminated with precipitated solids which have not been separated from the water due to the relatively poor separation achieved by such flocculant induced agglomeration processes. Furthermore, processes using flocculants and trommel screens cannot concentrate slimes more than about 20% solids concentration.

Crossflow filtration has been used for processes such as reverse-osmosis, dialysis, and ultra-filtration. In general, these particular processes treat relatively and usually extremely dilute solutions and/or suspensions. Crossflow filters for such processes have used both tubular and spiral-wound membranes.

U.S. Pat. No. 4,301,013 discloses a spiral-wound membrane which is particularly useful for the concentration of cheese whey in the dairy industry. U.S. Pat. No. 4,299,702 discloses another spiral-wound type membrane useful in reverse osmosis or ultrafiltration separation processes. U.S. Pat. No. 3,401,798 discloses another spirally-configured, semi-permeable membrane laminate apparatus for separating constituants in a feed slurry, wherein permeable membranes are disposed on opposite surfaces of a laminate In commercial product bulletins, tubular membrane configurations and spiral-wound membrane configurations are disclosed as useful separation devices in the electrocoat paint and dairy industries and oil recovery, oil/water separation, protein recovery, enzyme concentration, latex and PVA concentration and cationic electrophoretic paint recovery processes. Reported preliminary tests of concentration of phosphate slimes by crossflow filtration, using woven fire-hose jackets and 325-mesh stainless steel screen supports, apparently in a tubular configuration, resulted in 47% water recovery at a flow rate ostensibly less than 5 ft/sec.

Accordingly, it can be appreciated that there is a need for new technology and processes to reduce or greatly eliminate the need for settling ponds for phosphatic waste and phosphoric acid slimes. The elimination or substantial reduction of such impoundment areas not only permits the land to be used for other purposes and eliminates the potential hazard of dam failure, but also substantially reduces the time the major part of the process solvent, usually water, is in inventory in the slimes treatment system. Furthermore, slimes which have been densified to about 27% to about 30% or higher by weight suspended solids have a sufficiently high enough density, and small enough volume, to enable such wastes and slimes to be completely disposed of in the mined out cavity from which their derivative phosphate rock was removed.

SUMMARY OF THE INVENTION

This invention provides for a method of concentrating liquid suspensions of phosphatic waste and phosphoric acid slimes by dewatering in a crossflow filter which is operable for separating a permeate and forming a concentrate having a suspended solids concentration substantially higher than the suspended solids concentration prior to such dewatering. By the expression "phosphatic wastes" and "phosphoric acid slimes" as used herein is meant the waste product from a washing and beneficiation of phosphate rock which typically contains small particles of clays. Such wastes can also contain and usually do contain, phosphorous values which are usually too costly to try to recover. Unless otherwise specified, the terms phosphatic wastes, phosphoric acid slimes, and slimes as used herein are alternate expressions meaning those substances which comprise the finely divided particles of waste material remaining after removal of all or part of the phosphorous values from phosphate rock. As mentioned above, such wastes, which are usually produced by water based processes, are usually disposed of in slime ponds or settling ponds. This invention can also be used to concentrate the phosphatic wastes that have been impounded in slime or settling ponds if it is desirable to reclaim the land or recover the water. Non-aqueous solvents can be employed and the slimes produced with such solvents can be densified by this invention.

Phosphoric acid slimes vary in composition depending on the ore body from which the phosphate rock is mined. Such slimes also vary substantially in particle size and particle size distribution depending on the particular ore body and the mining and beneficiation processes employed. For example, during such phosphorous recovery processes a typical phosphoric acid slime has, for example, a suspended solids content 90% of which is smaller than about 43 microns, 65% of which is smaller than about 5 microns, and 30% of which is smaller than about 0.2 microns. Because of the very fine nature of such slimes, it is generally believed that filter aids or flocculants must be used if blinding of the filter surface is to be prevented and efficient filtration achieved. In this invention, however, it is not necessary to use either a filter aid or a flocculant. In fact, in one embodiment introduction of an effective amount of a filter aid or flocculant to the system (as presently practiced in the industry for improving filtration) is deliberately prevented.

In general in this invention, a liquid mixture of phosphatic waste or phosphoric acid slimes is introduced into a crossflow filter which is operable for separating a permeate from such liquid-solid mixture. In one embodiment, the permeate is essentially pure solvent, and preferably the solvent is water. By the expression "essentially pure solvent" as used herein is meant that the solvent, which is usually water, contains no more than about 5000 ppm of suspended solids. Dissolved solids, however can be, and in some embodiments are, significant and can even be substantial.

If desired, the permeate can be produced having a suspended solids content of 1% or even higher; however, in order to produce such a high solids content the crossflow filter system must permit a certain amount of bleed through of the concentrate. Bleed through can be varied by choice of filtering material employed. For example, permeates having such high suspended solids concentrations can be recycled to the washing plant. Thus, in some plants, it may be economical to produce at least some permeates having a high solids content. Of course, a recycled stream of any desired solids content can be formed by merely blending a permeate which is essentially pure solvent and concentrate which has not been dewatered or only partly dewatered.

In general, the flow rate of the liquid mixture into the crossflow filter is maintained at a value which is operative for preventing the formation of a filter cake on the filtering surface of the crossflow filter and for increasing the concentration of the suspended solids contained in the liquid-solid mixture. By the expression "to prevent the formation of a filter cake" on a crossflow filter as used herein is meant that essentially no filter cake is permitted to build up on the filter so that essentially as soon as solids are deposited on the filter surface, such solids are essentially immediately removed by the continual flow of the feed slime or non-permeated aqueous mixture over the filter surface. This expression is also meant to allow for and include the presence of a very small particulate solid film on the filtering surface. Such solid film can be as large as about 100 microns (4 mils) in thickness but usually between about 1 and about 30 microns (0.04 and 1.2 mils).

In one embodiment the velocity of the slimes over the filtering surface of the crossflow filter is maintained between about 5 and about 30 ft/sec. In a preferred embodiment the velocity is maintained between about 5 and about 15 ft/sec, and in an especially preferred embodiment the velocity is maintained between about 8 and about 10 ft/sec. By maintaining the slime velocity over the filtering surface at 5 ft/sec. or higher a filter cake is prevented from forming.

Crossflow filtration conducted so as to prevent the formation of a filter cake on the filtering surface as described produces a permeate which is substantially free of suspended solids and a concentrated slime which contains essentially all of the suspended solids fed into the crossflow filter. In addition, by preventing a filter cake from existing on the filter medium surface by maintaining the velocity across the filter medium surface at an effective velocity, for example, 5 ft/sec. or higher, a relatively high permeation rate can be achieved which greatly improves the economics of the desolventing or dewatering of the slimes.

In one embodiment, a plurality of crossflow filter stages is employed wherein a permeate is separated from the liquid-solid mixture and after each crossflow filtration stage. The concentrate from the first crossflow filtration stage is treated in a second crossflow filtration stage for purposes of separating additional permeate. Concentrate from the second crossflow filtration stage may be treated in a third crossflow filtration stage to remove additional permeate. The process may be continued in a series of crossflow filtration stages wherein a permeate and concentrate are separated after each stage and the concentrate fed to a subsequent filtering stage. Such series of crossflow filtration stages may contain 4 or 5 stages, or more if desired.

In one embodiment wherein aqueous phosphoric acid slimes are treated, it is preferred to use a 3 or 4 stage system in order to obtain a concentrated slime having a suspended solids concentration of at least about 24% by weight, preferably 27% and especially preferably 30% or higher.

The crossflow filter can comprise a tubular filter medium through which the permeate passes through, and through which the suspended solids of the phosphatic waste or phosphoric acid slimes essentially will not pass. The feed slimes can be pumped over the outside diameter of the tubular filter medium so that the permeate flows from the outside to the inside diameter of the tubular filter medium. Alternatively, the slimes can be pumped through the inside diameter of the tubular filter medium so that the permeate flows radially outwardly through the tubular filter medium where it is collected on the outside diameter of the tubular filter medium.

The crossflow filter can be a spiral-wound, crossflow filter. Preferably, such spiral-wound filter comprises a perforated central tube upon which a composite sheet which comprises a membrane, a carrier material, a membrane and a feed channel spacer are wound. In a crossflow filter containing a spiral-wound module, the slimes can be caused to enter one end of the module external to the perforated tube, and a concentrate to be discharged from the opposite end of the module also external to the perforated tube, while a permeate is caused to flow inwardly through the module and into the perforated tube. Other arrangements and modifications of spiral-wound crossflow filters can be used.

Preferably, a series of crossflow filters are used and the concentrates from one filter is pumped to the subsequent crossflow filter. In a system which comprises a series of 4 or more crossflow filters preferably the slimes to the first stage crossflow filter and the concentrate to the second stage crossflow filter are pumped by means of a centrifugal pump while in the latter stages a positive displacement pump is used.

In a preferred embodiment, an effective amount of a flocculant or an effective amount of a filter aid is prevented from being introduced into the crossflow filter either admixed with the slimes or concentrate, as the case may be, or apart therefrom. In this invention, neither a flocculant nor a filter aid is required, and in fact, it is even desirable to prevent the introduction of such substances into the filtration system. By preventing the introduction of a flocculant or a filter aid or other additive materials into the filtration system a permeate is produced which is completely free of such additives. As such, the permeate can be recycled to any part of the washing or beneficiation operation.

In one embodiment, the crossflow filter comprises a filter medium through which the solvent will pass through, and through which the suspended solids of the waste or slimes essentially will not pass. By the expression "essentially will not pass" is meant herein that the solvent or permeate will contain no more than about 5000 ppm by weight of suspended solids. Preferably, the permeate will contain less suspended solids than that of the fresh water available at the plant site. It is especially preferable that permeate contain no more than about 100 ppm by weight of suspended solids. In another embodiment the filtering material and the dewatering is conducted under conditions operable to produce a permeate which has a turbidity of less than about 5 Jackson Turbidity Unit (JTU). In this invention, it is relatively easy, if desired to select a filtering material for the crossflow filter that will produce a permeate that has less turbidity than the local fresh water, and that will even remove bacteria from the water. Dissolved substances may not be removed, however, in certain cases and embodiments of this invention, dissolved solids may also be removed by this process by reverse osmosis.

Standard test methods for measurement of turbidity are set forth in the 1979 Annual Book of ASTM Standards, Part 31, Water, pages 230 to 236, which is hereby incorporated herein by reference. Methods and apparatus for determining the turbidity of water in Jackson Turbidity Units are set forth in Standard Methods For The Examination of Water and Wastewater, 15th Edition published by American Public Health Association, D.C., pages 131 to 136, which is hereby incorporated herein by reference.

DESCRIPTION OF THE PREFERRED EMBODIMENT

The process will be further illustrated by the dewatering of aqueous slimes produced during the washing and beneficiation of phosphate rock. The process can be used for solvents other than water if desired.

Figure 1:
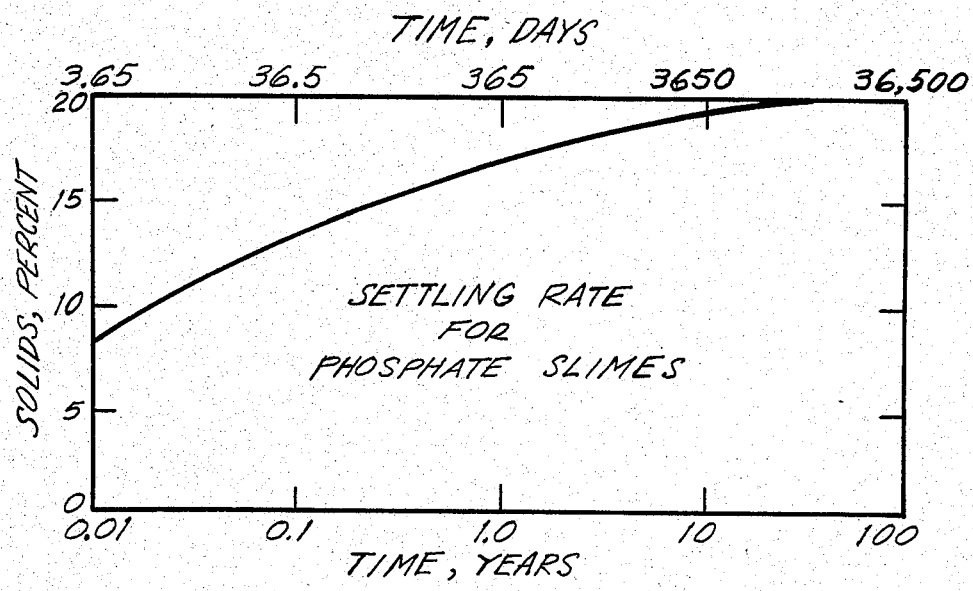
FIG. 1 is a typical settling curve for aqueous phosphoric acid slimes.
Figure 2:
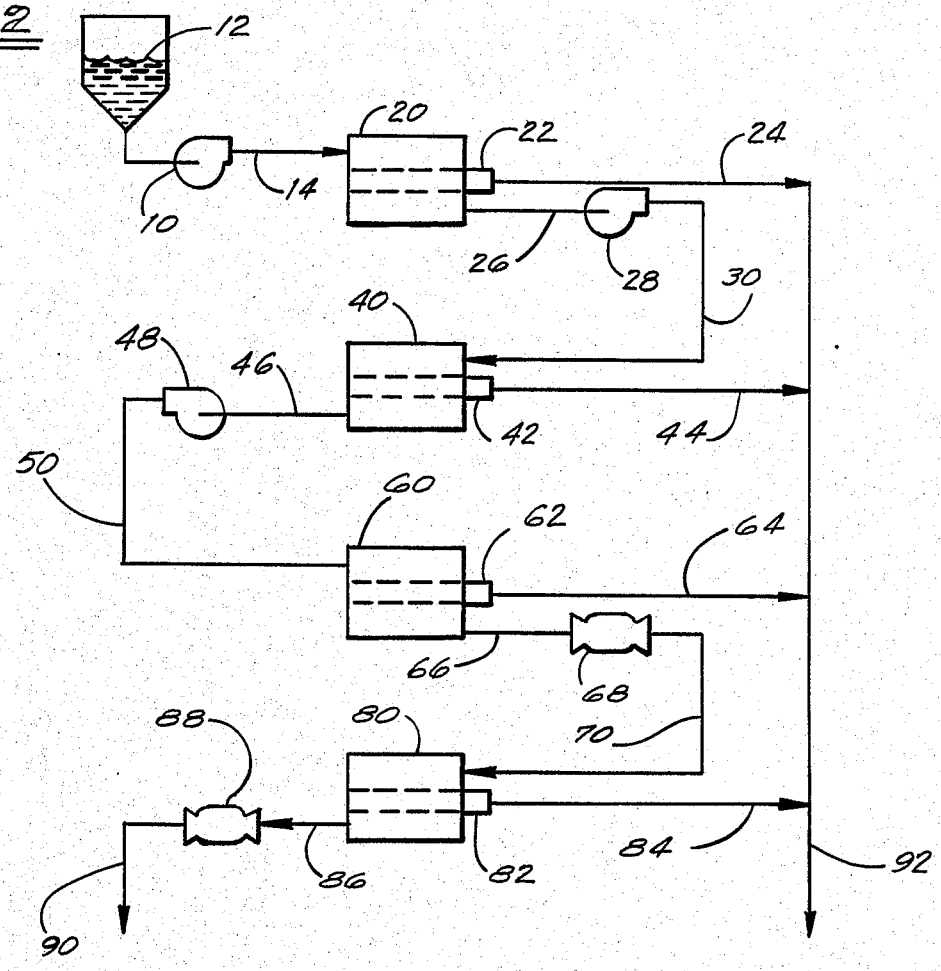
FIG. 2 is a flow diagram for concentration of phosphoric acid slimes in a four-stage crossflow filter.

Referring to FIG. 2, centrifugal pump 10 pumps a 3% by weight suspended solids phosphoric acid slimes from storage 12 into conduit 14 and into first stage crossflow filter 20. Due to the pressure exerted by the pump and the characteristics of crossflow filter 20, the slimes are separated into a solvent or permeate and concentrated in filter 20. The permeate is collected in central tube 22 and removed through conduit 24. First, concentrated slimes, which contain about 10% suspended solids, are removed from filter 20 by way of conduit 26. The first concentrate is then pumped by centrifugal pump 28 through conduit 30 into second stage crossflow filter 40.

As in first stage filter 20, the first concentrate is separated into a solvent or second permeate and a second concentrate in filter 40. The second permeate is collected in central tube 42, and then fed into conduit 44. The second concentrate, which contains about 20% suspended solids, is removed through conduit 46 and pumped by positive displacement pump 48 through line 50 into third stage crossflow filter 60.

In filter 60, the second concentrate is separated into a solvent or third permeate and a third concentrate which contains about 30% suspended solids. The third permeate is collected in central tube 62, and then fed into conduit 64. The third concentrate is removed through conduit 66 and pumped by positive displacement pump 68 through conduit 70 into fourth stage crossflow filter 80.

In filter 80, the third concentrate is separated into a solvent or fourth permeate and a fourth concentrate which contains about 40% suspended solids. The fourth permeate is collected in central tube 82, and then fed into conduit 84. The fourth concentrate is removed through conduit 86 and pumped by positive displacement pump 88 through conduit 90 into a previously mined out area (not shown) or a concentrated slimes disposal site. Therefore in this system, the 3% solid slime feed is concentrated in first stage filter 20 to about 10%, which is then concentrated in second stage filter 40 to about 20%, which is then concentrated in third stage filter 60 to about 30%, which is then concentrated in final stage filter 80 to about 40% by weight suspended solids. The permeates, which were collected in lines 24, 44, 64 and 84 are manifolded to conduit 92. The permeate collected from the system generally has a suspended solid content less than the suspended solids content of the fresh water available at the plant site which is typically less than about 5000 ppm. Preferably, the permeate contains no more than about 100 ppm, and especially preferably no more than about 10 ppm.

Crossflow filters 20, 40, 60 and 80 may be any type of crossflow filter. However, preferably filters 20, 40 and 60 are spiral-wound crossflow filters, and filter 80 is a tubular crossflow filter.

Figure 3:
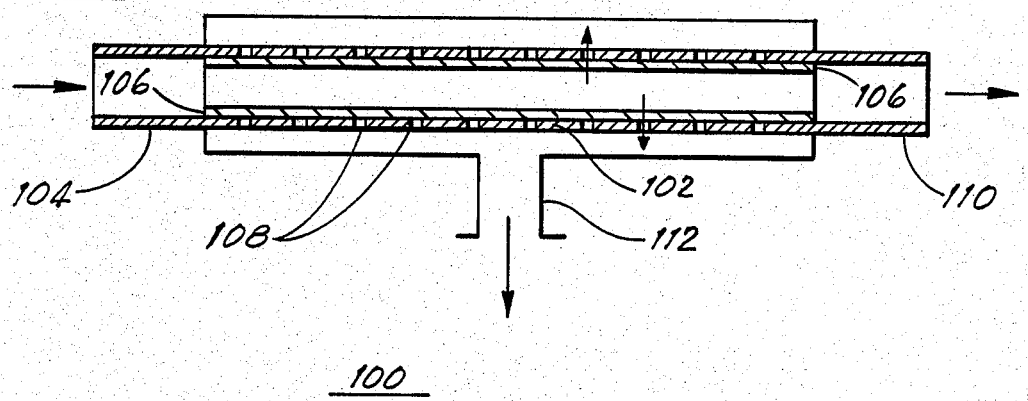
FIG. 3 is a diagram of a tubular crossflow filter.

Tubular crossflow filter 100 is shown in FIG. 3. Slimes are pumped into central tube 102 at end 104. Center tube 102 contains an annulus of filter media 106 which is held against inside diameter of tube 102 by the pressure of the slimes. The center part of the tube 102 contains a plurality of perforations 108 through which permeate is caused to flow. A concentrated slime is removed from central tube 102 from discharge end 110 which is opposite from inlet end 104. When in use, filtering medium 106 is forced against perforations 108 of central tube 102. Permeate is forced through filter medium 106 and perforations 108 and is then removed through conduit 112. Filter medium 106 may comprise both a membrane means and a carrier means, for example, a composite filter medium can be formed where a carrier means is sandwiched between the filter medium or membrane means and the perforated support tube to provide additional mechanical support for the filter medium.

Where filter medium 110 is woven and has enough strength it can be used without a support, such as perforated central tube 102. In such cases the permeate must flow from the inside diameter of tubular or annular filter medium 106, through filter medium 106 and be collected on the outside diameter of filter medium 106. Such a tubular crossflow filter would be similar to that shown in FIG. 3 except that the center part of central tube 102, which normally acts as a support for media 106, would not be required.

Alternately if desired, a tubular crossflow filter can have the filtering medium wrapped tightly around the outside of perforated central tube 102. For such an arrangement the slimes flow through the annular space surrounding the outside diameter of the filter medium. Permeate flows through the filter medium and then through the perforations in the central tube. For this configuration, outlet 112 is removed. Permeate is collected and removed from inside the central tube. In this alternate configuration it is necessary to have a central tube to act as a support for the filter medium.

Figure 4:
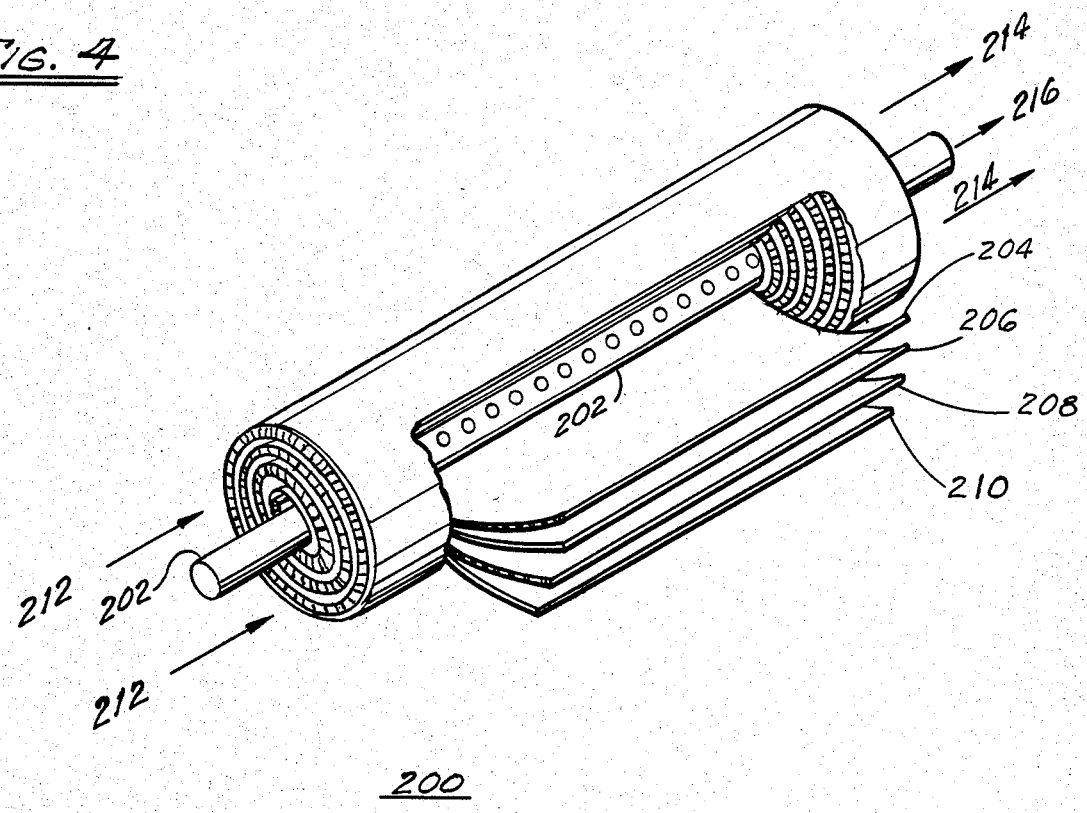
FIG. 4 is an expanded diagram of a particular spiral-wound crossflow filter module.

An expanded view of spiral-wound crossflow filter module 200 is shown in FIG. 4. Module 200 is housed in a cylindrical casing (not shown). Module 200 comprises central perforated tube 202 (the perforations of which are not shown), membrane material 204, carrier material 206, membrane material 208, and channel spacer 210 which are spirally-wound upon central perforated tube 202. Slimes are forced into the module in the direction of arrows 212 whereupon it flows through spirally-wound channel spacer 210 and discharges from the module in the directions of arrows 214. As the slimes are forced to flow through channel spacer 210 the solvent is separated from the slimes and by permeation through membranes 204 and 208 into carrier material 206. If desired, carrier material 206 and membranes 204 and 208 can be the same element. For example, felt is capable of acting both as a membrane material and as a carrier material. The separated solvent or permeate is discharged from the carrier material through the perforations (not shown) in central tube 202 wherein the permeate is collected. Permeate is removed from central tube 202 as shown by arrow 216. Module 200 is tightly contained in a cylindrical housing in such a manner that feed stream 212 is not permitted to bypass crossflow filter module 200 but must flow through spirally-wound channel spacer 210.

EXPERIMENTAL DATA

In order to speed the selection of filter media, a test crossflow unit with a 2"×2" filter area was used. The results of experimental tests with the test crossflow unit are given in Table I. From this data it appears that there is no correlation between the slime permeation rate and the permeation rate of pure water. The surface characteristics and weave of the filter fabric ostensibly control the permeation rate of the slime. Filter materials marked with the asterisk in Table 1 were considered the best.

A prototype tubular crossflow filtering (TCF) unit which consists of two concentric Lexan (TM) transparent tubes, the outer tube of which was $\frac{3}{8}$" in inside diameter. The inner tube, which was perforated, was $\frac{1}{4}$" in outside diameter. The inner tube was wrapped with layers of felt, a woven fiber glass sleeve and a tightly fitted tubular filter. The clearance between the filtering surface and the inside diameter of the outer tube, which define an annular space, was 1/16". Slimes were pumped through the annular space with an average velocity of between about 8 and about 10 ft/sec. Clear water permeated through the tightly fitted tubular filter, sleeve, felt, and the perforation in the inner tube to a collector. The effective length of the filter tube was about 8.2" after correcting for end effects.

Slimes were pumped at 30 psig and about 20° C. into the TCF unit at a velocity of 9.5 ft/sec. Using as a filter medium a Versapore (TM), having a porosity of 0.8 microns, the permeation rates ranged from about 140 to 190 gallons/day/ft$^2$ (GDF) for a 9.3% solid slime, and 125 GDF for a 16.9% concentrated solid slime. The permeate produced was crystal clear. For the 9.3% concentrated solid slimes, the permeation rate remained steady from the beginning of the test to its conclusion, 5.5 hours later. It was also noticed that by using freshly prepared slimes having a 8.9% solids concentration, the permeation rate under identical conditions as described above were as high as 263 GDF but leveled off to about 217 GDF after the feed was repeatedly pumped and recycled.

Table II gives the calculated amounts of water that need to be removed in order to reach solids concentrations up to 30% starting from 4.7% solids concentration.

A comparison of the cost of crossflow filtration and flocculation followed by screening in a trommel is given in Table III. As can be seen, crossflow filtration is believed to be about 50%, and possibly even more, cheaper than flocculation and trommel.

A preliminary correlation was developed between the percent suspended solids in the slimes as a function of permeation rate, expressed as GDF, under feed conditions of 17° to 20° C., and an upstream pressure about 30 psig, and with a velocity across the filter of 9.5 ft/sec, using Versapore filter medium having an 0.8 microns nominal pore size.

The correlation is as follows:

$$Y = -1289X + 343.5,$$

where Y is the permeation rate expressed in GDF, and X is the weight fraction of solids in the feed slime stream. The correlation was tested for values of X between 0.025 and 0.24.

For weight fractions of solids greater than 0.24, the permeation rate begins to level off to nearly a constant value. Because of the apparent asymptotic character of the permeation rate-weight fraction curve, permeation rates for weight fractions over 0.24 may be estimated by merely using the calculated value for a weight fraction of 0.24. Using the above equation to calculate the permeation rate, the minimum filter area required to remove 92 million gallons/day of water from 104 million of slimes at 4.7% initial suspended solids initial concentration, is 530,000 ft$^2$. By removing 92 million gallons of water from the slimes, the concentration of suspended solids in the slimes will be increased from 4.7% to 30%.

A spiral-wound (SW) unit was also assembled and successfully tested. The permeation rate of the SW unit appears to follow the above equation very closely. Slimes were successfully concentrated from 4.17% to 22% suspended solids concentration before the slimes started to leak through the seal between the Versapore filter and the felt which was used as a permeate carrier. The 22% suspended solids concentrated slimes were further concentrated to 27% using a single tube unit. At 27% in the solids the slimes were too thick to flow through the feed pipe leading to the Moyno pump. This problem was eliminated by simply enlarging the feed pipe.

The permeation rates of the SW unit followed the above equation very closely. The grid structure of the spacer used in the SW unit was such that part of the filter area was not available for filtering so that the effective filter area in the SW unit was about 55% of the gross filter area. This is because the spacer utilized blocked off a certain amount of the filter medium's surface.

Preliminary economic estimates for the concentration of phosphoric acid slimes from 3% to 20% suspended solids concentration, indicates that crossflow filtration would cost $2.11 per ton of beneficiated rock, whereas flocculation and trommel would cost $4.18 per ton of beneficiated rock to reach a concentration of 20% suspended solids. The capital cost of both plants would be about $15 million. However, the flocculation and trommel method will not permit a concentration over about 20%, which because of its volume is much too high for disposing completely in the mined out area. This invention, however, allows the slimes to be concentrated to 30% or 40%, or even higher if desired.

All references to percents as used herein are percents by weight unless otherwise specified.

The foregoing disclosure and description of the present invention is illustrative and explanatory thereof, and various changes in the method steps as well as in the details of the illustrated system and apparatuses may be made within the scope of the appending claims without departing from the spirit of the invention. For example, any number of sequential crossflow filter stages may be used with any combination and types of pumps for transportation of the slimes, concentrates and permeates. Other configurations of both the tubular and spiral-wound crossflow filters can be used.

Furthermore, because of the reduction in volume of the concentrate after a crossflow filtration unit operation, a plurality of filtration units can be used to feed a subsequent crossflow filtration unit if desired. For example, the concentrate from 2 first stage crossflow filters can be combined and fed into a single second stage crossflow filter.

TABLE I

Permeation Rates of Slimes Through Various Filter Materials as Measured With a 2" × 2" Test Crossflow Unit

| | PERMEATION RATES (ml/min) | | | | |
|---|---|---|---|---|---|
| | Slimes | | | | Pure Water |
| Filter Material | (1) | (2) | (3) | (4) | |
| P & S Textile, 38 Propex | 5.4 | 3.2 | 3.4 | 3.2 | 1009 |
| , 324 Tery | 4.0 | 4.0 | 4.0 | 3.8 | 973 |
| , 244 Propex | 3.4 | 3.8 | 3.8 | 3.5 | 1039 |
| Polymax B, 22401002 | (5) | (5) | (5) | (5) | 500 |
| , 22202501 | 4.6 | 4.7 | 4.4 | 4.2 | 724 |
| Nylon, 15801802* | 5.8 | 5.0 | 4.5 | 4.4 | 432; 467 |
| , 15006300 | 3.0 | 2.8 | 2.7 | 2.6 | 525 |
| , 15003400* | 4.4 | 4.4 | 4.4 | 4.4 | 370 |
| Polyester, 19004704 | 4.2 | 3.8 | 3.6 | 3.8 | 523 |
| , 19614803 | 296. | 6.0 | 2.2 | 2.2 | 970 |
| , 19610403 | 8 | 5 | 4.4 | 3.2 | 854 |
| , 19001604 | (5) | (5) | (5) | (5) | 896 |
| , 19000601 | 6.8 | 3.2 | 2.8 | 2.4 | 894 |
| Polyester 19001604/Nylon 15801802 Combination | 7 | 5.6 | 4.8 | | — |
| Dacron (of Hemi Plant) | 292. | 4.0 | 3.2 | 2.6 | — |
| Whatman Paper, #42* | 5.4 | 4.0 | 5.0 | | |
| #4 | 5.2 | 4.8 | 3.2 | | |
| #2 | 6.6 | 5.4 | 5.4 | | |
| #3* | 5.5 | 5.6 | 5.6 | | |
| #541 | 4.8 | 4.2 | 4.0 | | |
| #7* | 5.0 | 4.8 | 4.8 | | |
| #41* | 5.0 | 4.8 | 4.6 | | |
| S & S Filter Paper, #595 | 4.0 | 3.2 | 2.8 | | |
| Cellulose, Whatman Thimble* | 6.4 | 5.0 | 4.8 | | |
| Polyvic From Millpore (6) | 4.8 | 3.6 | 3.6 | | |
| Nylon, 15002904 | 4.2 | 3.8 | 3.6 | | |
| Polyester, 19008302 | 4.0 | 4.0 | 3.0 | | |
| Gelman, Versapore, (7)* | 4.6 | 4.4 | 4.4 | | |

(1) initial permeation rate
(2) permeation rate after 30 minutes
(3) permeation rate after 60 minutes
(4) permeation rate after 90 minutes
(5) no retention of solids
(6) 0.6 micron pore size
(7) 0.8 micron pore size
All Test Crossflow Unit permeation tests conducted at about 25° C., 30 psig upstream pressure, with a pumping rate through the Unit of about 3.6 GPM.

TABLE II

CALCULATED VALUES

| Amount of Dry Solids in Slimes, (TPH) | Amount of Water in Slimes, (GPM) | Accumulated Amount of Water Removal, (GPM) | % Of Target Water Removal To Reach 30% Solids | % Solids In Slimes |
|---|---|---|---|---|
| 912 | 72,510 | 0 | 0 | 4.7 |
| 912 | 34,779 | 37,731 | 59 | 9.3 |
| 912 | 17,824 | 54,686 | 86 | 16.9 |
| 912 | 14,603 | 57,907 | 91 | 20 |
| 912 | 10,952 | 61,558 | 96 | 25 |
| 912 | 8,519 | 63,991 | 100 | 30 |

TABLE III

Cost Comparison of Crossflow Filtration To Flocculation and Trommel Operating and Capital Cost per Ton of Rock Produced

| CROSSFLOW FILTRATION | FLOCCULATION AND TROMMEL |
|---|---|
| $2.11 to Reach 20% Solids in Two Stages | $4.18 to Reach 20% Solids |
| $2.60 to Reach 30% Solids in Three Stages | Cannot Reach 30% Directly |

What is claimed is:

1. A process for dewatering an aqueous mixture which consists essentially of suspended solids and soluble values of phosphatic waste and water produced during the mining and beneficiation of phosphate ore comprising the steps of:
   (a) introducing an aqueous mixture consisting essentially of suspended solids and soluble values of phosphatic wastes and water into a crossflow filter having a filter with a filtering surface on one side in contact with said mixture and a permeate surface on the other side, said filter hydraulically separating an aqueous permeate consisting essentially of water and soluble values of phosphatic waste from said aqueous mixture, said crossflow filter operable for separating by filtration the aqueous permeate from said mixture;
   (b) maintaining the flow rate of said mixture over said filtering surface at a velocity of at least about 5 ft/sec to prevent the formation of a filter cake on the filtering surface of said filter, said filtering surface having a layer of solid particulates of not more than 100 microns in thickness formed by said suspended solids in the course of the filtration of said aqueous mixture; and
   (c) dewatering said aqueous mixture by separating the aqueous permeate from said mixture by filtration through said filter to form a dewatered aqueous mixture containing water, soluble values of the phosphatic waste and the suspended solids of the phosphatic waste.

2. The process of claim 1 wherein said aqueous permeate comprises at least about 35% of the water contained in said aqueous mixture introduced into said filter in step (a).

3. The process according to claim 1 further comprising the steps of
   (d) passing said dewatered aqueous mixture containing water, soluble values of the phosphatic waste, and the suspended solids of the phosphatic waste from in the first crossflow filter into a second crossflow filter having a filter with a filtering surface on one side in contact with said dewatered aqueous mixture and a permeate surface on the other side, said filter hydraulically separating an aqueous permeate consisting essentially of water and soluble values of phosphatic waste and said dewatered aqueous mixture, said crossflow filter operable for separating by filtration the aqueous permeate from said dewatered aqueous mixture,
   (e) maintaining the flow rate of said dewatered aqueous mixture over said filtering surface in said second crossflow filter at a velocity of at least about 5 ft/sec to prevent the formation of a filter cake on the filtering surface of said filter, said filtering surface having a layer of solid particulates of not more than 100 microns in thickness formed by the suspended solids from said dewatered aqueous mixture in the course of the filtration of said aqueous mixture; and
   (f) dewatering said dewatered aqueous mixture by separating the aqueous permeate from said mixture by filtration through said filter of said second crossflow filter to form a second dewatered aqueous mixture containing water, soluble values of the phosphatic waste, and the suspended solids of said phosphatic wastes.

4. The process of claim 3 wherein said aqueous permeate separated in steps (c) and (f) comprise at least about 50% of the water contained in said aqueous mixture introduced in said crossflow filter in step (a).

5. The process of claim 3, wherein each of said crossflow filters comprises a tubular filter medium through which said aqueous permeate passes through, and through which the suspended solids of said phosphatic waste solids essentially will not pass.

6. The process of claim 3, wherein said crossflow filter in step (a) is a spiral-wound crossflow filter, and wherein said second crossflow filter is a spiral-wound crossflow filter.

7. The process according to claim 3 further comprising the steps of:
   (g) passing said second dewatered aqueous mixture containing water, soluble values of phosphatic waste, and the suspended solids of the phosphatic waste from the second crossflow filter into a third crossflow filter having a filter with a filtering surface on one side in contact with said second dewatered aqueous mixture and a permeate surface on the other side, said filter hydraulically separating the second dewatered aqueous mixture from an aqueous permeate consisting essentially of water and soluble values of phosphatic waste, said crossflow filter operable for separating by filtration the aqueous permeate from said second dewatered aqueous mixture;
   (h) maintaining the flow rate of said second dewatered aqueous mixtures over said filtering surface in said third crossflow filter at a velocity of at least about 5 ft/sec to prevent the formations of a filter cake on the filtering surface of said filter, said filtering surface having a layer of solid particulates of not more than 100 microns in thickness formed by the suspended solids from said second mixture in the course of filtration; and (i) dewatering said second aqueous mixture by separating the aqueous permeate from said mixture by filtration through said filter to form a third dewatered aqueous mixture containing water, soluble values of phosphatic waste, and the suspended solids of the phosphatic waste.

8. The process of claim 7 wherein said permeates separated in steps (c), (f) and (i) comprises at least about 75% of the water contained in said aqueous mixture introduced into said filter in step (a).

9. The process of claim 7 wherein the weight ratio of solids to water in said third dewatered aqueous mixture separated in step (i) is at least about 8 times larger than the weight ratio of solids to water in said aqueous mixture which is introduced into said filter in step (a).

10. The process of claim 7 wherein the weight ratio of solids to water in said third dewatered aqueous mixtures separated in step (i) is at least about 15 times larger than the weight ratio of solids to water in said aqueous mixture which is introduced into said filter in step (a).

11. The process of claim 7, wherein each of said crossflow filters comprises a tubular filter medium through which said aqueous permeate passes through, and through which the suspended solids of said phosphatic waste solids essentially will not pass.

12. The process of claim 7, wherein said crossflow filter of step (a) is a spiral-wound crossflow filter, and wherein said second and third crossflow filters are spiral-wound crossflow filters.

13. The process of claim 1, wherein the velocity of said aqueous mixture over the filtering surface of said crossflow filter is between about 5 and about 30 ft/sec.

14. The process of claim 13, wherein the velocity is between about 5 and about 15 ft/sec.

15. The process of claim 13, wherein the velocity is between about 8 and about 20 ft/sec.

16. The process of claim 1, wherein said crossflow filter comprises a tubular filter medium through which said aqueous permeate passes through, and through which the suspended solids of said phosphatic waste solids essentially will not pass.

17. The process of claim 1, wherein said permeate has a turbidity less than about 5 Jackson turbidity units.

18. The process of claim 1, wherein said crossflow filter is a spiral-wound crossflow filter.

19. A process for dewatering and concentrating phosphoric acid slimes consisting essentially of suspended solids, soluble values and water comprising:

(a) introducing phosphoric acid slimes consisting substantially of suspended solids, soluble values and water into the crossflow filter having a filter with a filtering surface on one side in contact with said slimes and a permeate surface on the other side, said filter hydraulically separating said mixture and an aqueous permeate consisting essentially of water and soluble values, said crossflow filter operable for separating by filtration the aqueous permeate from said slimes, said slimes having a suspended solids concentration of from about 1 to about 20% by weight;

(b) maintaining the flowrate of said slimes over said filtering surface at a velocity of at least about 5 ft/sec to prevent the formation of a filter cake on said filtering surface, said filtering surface having a layer of solid particulates of not more than 100 microns in thickness formed by filtration of solids from said slimes; and (c) dewatering said slimes by separating the aqueous permeate from said slimes by filtration through said filter to form a slimes concentrate having a suspended solids concentration at least 1.5 times greater than the suspended solids concentration of the feed phosphoric acid slimes.

20. The process of claim 19, wherein the velocity of said slimes over the filtering surface of said crossflow filter is between about 5 and about 30 ft/sec.

21. The process of claim 20, wherein said velocity is between about 5 and about 15 ft/sec.

22. The process of claim 20, wherein said velocity is between about 8 and about 10 ft/sec.

23. The process of claim 19, wherein said crossflow filter comprises a tubular filter medium through which said aqueous permeate passes through, and through which the suspended solids of said phosphoric acid slimes essentially will not pass.

24. The process of claim 19, wherein said permeate has a turbidity less than about 5 Jackson turbidity units.

25. The process of claim 19, wherein said crossflow filter is a spiral-wound crossflow filter.

26. A process for concentrating phosphoric acid slimes consisting substantially of suspended solids, soluble values and water, comprising the steps of:

(a) pumping phosphoric acid slimes consisting substantially of suspended solids, soluble values and water into a first crossflow filter having a filter with a filtering surface on one side in contact with said slimes and a permeate surface on the other side, said filter hydraulically separating said slimes from an aqueous permeate consisting essentially of water and soluble values, said crossflow filter operable for separating by filtration the aqueous permeate containing no more than about 100 ppm of suspended solids from said slimes;

(b) maintaining the flow rate of said slimes over said filtering surface of said first crossflow filter at a velocity of at least about 5 ft/sec to prevent the formation of a filter cake on said filtering surface, said filtering surface having a layer of said particulates of not more than 100 microns in thickness formed by filtration of solids from said mixture;

(c) dewatering said slimes by separating the aqueous permeate from said slimes by filtration through the filter of said first crossflow filter to form a first slimes concentrate containing water and soluble values, and substantially all of the suspended solids of said phosphoric acid slimes;

(d) passing said first slimes concentrate from said first cross flow filter into a second crossflow filter having a filter with a filtering surface on one side in contact with said first concentrate and an aqueous permeate surface on the other side, said filter hydraulically separating said first concentrate from a second aqueous permeate consisting essentially of water and soluble values, said second crossflow filter operable for separating the second aqueous permeate containing no more than about 100 ppm of suspended solids from said first concentrate;

(e) maintaining the flow rate of said first concentrate over the filtering surface of said second crossflow filter at a velocity of at least about 5 ft/sec to prevent the formation of a filter cake on said filtering surface of said second crossflow filter, said filtering surface having a layer of solid particulates of not more than 100 microns in thickness formed by filtration of suspended solids from said first concentrate;

(f) dewatering said first concentrate by separating the second aqueous permeate from said first slimes concentrate by filtration through said filter to form a second slimes concentrate containing substantially all of the suspended solids of said first concentrate;

(g) passing said second concentrate from the second into a third crossflow filter having a filter with a filtering surface on one side in contact with said second concentrate and an aqueous permeate surface on the other side, said filter hydraulically separating said second concentrate from a third aqueous permeate consisting essentially of water and soluble values, said third crossflow filter operable for separating the aqueous permeate containing less than about 100 ppm of suspended solids from said second concentrate;

(h) maintaining the flowrate of said second concentrate over the filtering surface of said third crossflow filter at a velocity of at least about 5 ft/sec to prevent the formation of a filter cake on said filtering surface of said third crossflow filter, said filtering surface having a layer of solid particulates of not more than 100 microns in thickness formed by filtration of solids from said mixture; and (i) dewatering said third concentrate by separating the third aqueous permeate from said mixture by filtration through said third crossflow filter to form a third slimes concentrate containing substantially all of the suspended solids of said second slimes concentrate.

27. The process of claim 26, wherein said first, second and third permeates when combined amount to at least about 85% of the water contained in said slimes introduced into said first stage crossflow filter in step (a).

28. The process of claim 26, wherein said first, second, and third permeate has a turbidity less than about 5 Jackson turbidity units.

29. The process of claim 26, wherein said first, second, and third stage crossflow filters are spiral-wound crossflow filters.

30. The process of claim 29, further comprising:

(j) pumping said third concentrate into a fourth stage tubular crossflow filter operable for separating a permeate which comprises water and no more than about 100 ppm of suspended solids from said third concentrate;

(k) maintaining the flow rate of said third concentrate over the filtering surface of said fourth stage tubular crossflow filter at a value which is operative for preventing the formation of a filter cake on said filtering surface of said fourth stage tubular crossflow filter; and (l) separating a fourth permeate which comprises water and no more than about 100 ppm of suspended solids from said third concentrate and forming a fourth concentrate which comprises essentially all of the suspended solids of said third concentrate pumped into said fourth stage tubular crossflow filter.

* * * * *